United States Patent
Budda et al.

(10) Patent No.: US 9,211,594 B2
(45) Date of Patent: Dec. 15, 2015

(54) END MILL HAVING A SYMMETRIC INDEX ANGLE ARRANGEMENT FOR MACHINING TITANIUM

(71) Applicant: Iscar, Ltd., Tefen (IL)

(72) Inventors: Eliyahu Budda, Neve Ziv (IL);
Alexander Khina, Kfar Vradim (IL);
Gabby Zehavi, Carmiel (IL)

(73) Assignee: Iscar, Ltd., Tefen (IL)

( * ) Notice: Subject to any disclaimer, the term of this patent is extended or adjusted under 35 U.S.C. 154(b) by 285 days.

(21) Appl. No.: 13/766,509

(22) Filed: Feb. 13, 2013

(65) Prior Publication Data
US 2014/0227050 A1 Aug. 14, 2014

(51) Int. Cl.
B23C 5/00 (2006.01)
B23C 5/10 (2006.01)

(52) U.S. Cl.
CPC .............. B23C 5/10 (2013.01); *B23C 2210/045* (2013.01); *B23C 2210/0407* (2013.01); *B23C 2210/0485* (2013.01); *B23C 2210/123* (2013.01); *B23C 2210/40* (2013.01); *B23C 2222/88* (2013.01); *Y10T 407/196* (2015.01); *Y10T 407/1948* (2015.01); *Y10T 407/1952* (2015.01)

(58) Field of Classification Search
CPC ............... B23C 2200/083; B23C 2200/28; B23C 2200/283; B23C 2200/286; B23C 2200/32; B23C 2210/0485; B23C 2210/0492; B23C 2210/282; B23C 2222/88
USPC ..................................... 407/53–63
See application file for complete search history.

(56) References Cited

U.S. PATENT DOCUMENTS

| | | | |
|---|---|---|---|
| 4,963,059 A * | 10/1990 | Hiyama | 407/60 |
| 5,779,399 A | 7/1998 | Kuberski | |
| 5,947,659 A | 9/1999 | Mays | |
| 6,164,876 A | 12/2000 | Cordovano | |
| 6,899,494 B2 | 5/2005 | Walrath | |
| 6,991,409 B2 | 1/2006 | Noland | |
| 7,001,113 B2 | 2/2006 | Flynn et al. | |

(Continued)

FOREIGN PATENT DOCUMENTS

CN 102303158 10/2012
DE 10325600 A1 1/2005

(Continued)

OTHER PUBLICATIONS

International Search Report dated Jun. 11, 2014 issued in PCT counterpart application (No. PCT/IL2014/050069).

*Primary Examiner* — Daniel Howell
*Assistant Examiner* — Nicole N Ramos
(74) *Attorney, Agent, or Firm* — Womble Carlyle Sandridge & Rice PLLC

(57) ABSTRACT

An end mill for machining titanium includes a cutting portion having blunt cutting edges alternated with flutes. Each flute includes, in order from the cutting edge, a rake surface, a concavely shaped bending portion, a convexly shaped ejecting portion and a tooth relief edge. The convexly shaped ejecting portion has an ejection height E, which is measurable between an apex of the ejecting portion to an imaginary straight line extending from a nadir of the adjacent bending portion of the flute to the adjacent tooth relief edge. In a plane perpendicular to a rotation axis of the end mill, the ejection height E and a cutting portion diameter $D_E$, fulfill the condition $0.010D_E < E < 0.031D_E$.

32 Claims, 6 Drawing Sheets

(56) References Cited

U.S. PATENT DOCUMENTS

| | | |
|---|---|---|
| 2002/0031409 A1 | 3/2002 | Sato et al. |
| 2007/0154272 A1* | 7/2007 | Wells et al. ................ 407/54 |
| 2007/0196186 A1 | 8/2007 | Volokh |
| 2007/0286691 A1* | 12/2007 | Glimpel et al. ............. 407/54 |
| 2011/0013998 A1* | 1/2011 | Tardivo ...................... 407/53 |
| 2011/0085862 A1 | 4/2011 | Shaffer |
| 2011/0217132 A1 | 9/2011 | Wells et al. |

FOREIGN PATENT DOCUMENTS

| | | | |
|---|---|---|---|
| JP | 57132910 A | * | 8/1982 |
| JP | S61 89418 U | | 6/1986 |
| JP | 05038606 A | * | 2/1993 |
| JP | 2005 297108 | | 10/2005 |
| JP | 2007136626 A | * | 6/2007 |
| JP | 2010120099 A | * | 6/2010 |
| JP | 2011093036 A | * | 5/2011 |

* cited by examiner

US 9,211,594 B2

END MILL HAVING A SYMMETRIC INDEX ANGLE ARRANGEMENT FOR MACHINING TITANIUM

FIELD OF THE INVENTION

The subject matter of the present application relates to end mills configured for machining titanium.

BACKGROUND OF THE INVENTION

Titanium can be considered a relatively difficult material to mill as the properties thereof can quickly degrade an end mill. Such degradation is believed, in theory, to be at least in part due to heat transfer of a workpiece made of titanium to an end mill machining the workpiece.

Aside from heat transfer, another consideration when designing end mills is evacuation of chips. Flute shape is accordingly taken into account during end mill design. CN 20145538, CN 102303158 and CN 202199817 disclose end mills having flutes shape in accordance with different mathematical models.

Yet another consideration is reduction of end mill chatter. Reduction of chatter can be achieved, in theory, by designing end mills with asymmetric features, for example, as disclosed in U.S. Pat. No. 6,991,409, U.S. Pat. No. 7,306,408 and U.S. Pat. No. 8,007,209. FIG. 1 of U.S. Pat. No. 8,007,209 also disclosing an end mill having serrations (FIG. 1, reference numeral 7).

While many end mills appear similar, upon close inspection there are often many small but relevant differences, some differences being critical as to whether an end mill can achieve a desired machining operation of a particular type of material or under particular cutting conditions.

Commonly, cutting edges are placed at different index angles with respect to each other, helix, radial rake and axial rake angles may vary at different cutting edges and even may vary along a single cutting edge. Orientation, position and size of each element in an end mill may have significant effect on the performance thereof.

In view of the extremely large number of variations of design possible, there is ongoing research to try and find more efficient end mills, especially for machining specific materials such as titanium.

SUMMARY OF THE INVENTION

It has been found that an end mill combining a particular tooth shape and a particular flute shape can achieve surprising longevity when machining titanium under certain conditions.

More precisely, the tooth shape comprises a blunt cutting edge (the cutting edge being at an intersection of a rake cutting sub-surface and a relief surface) and a recessed rake sub-surface (hereinafter a "rake recessed sub-surface") extending from the rake cutting sub-surface.

While blunt cutting edges could be considered detrimental, due to relatively increased machining power requirements caused thereby, experimental results have shown otherwise.

More precisely, a blunt cutting edge is defined as having an actual internal cutting angle formed at an intersection of a rake cutting sub-surface and a relief surface, the actual internal cutting angle having a greater value than an imaginary internal cutting angle formed at an intersection of imaginary extension lines of the rake recessed sub-surface and the relief surface.

It will be understood that use of the term "blunt" when referring to a cutting edge hereinafter is interchangeable with the definition above.

Provision of a rake recessed sub-surface adjacent a rake cutting sub-surface (i.e. the rake recessed sub-surface adjacent being recessed further into a tooth than an adjacent rake cutting sub-surface relative to an imaginary radial line passing through the cutting edge, or, stated differently, the rake cutting sub-surface being raised above the rake recessed sub-surface relative to an imaginary radial line passing through the cutting edge), is believed, in theory, to reduce heat transfer to an end mill when machining titanium.

Similarly, minimizing the length of a rake cutting sub-surface is also believed to reduce heat transfer by reducing contact of chips with an end mill rake surface.

Referring now to the above-mentioned flute shape, the flute comprises a concavely shaped bending portion followed by a convexly shaped ejecting portion of a particular size.

The bending portion is configured for bending titanium chips during a milling operation. A flute comprising a bending portion is illustrated in FIG. 4 of CN 102303158.

Generally speaking, convexly shaped flute portions can provide structural strength to a tooth (i.e. allowing increased thickness thereof) and increased moment of inertia. The presence of such convex portion, however, reduces a flute's cross-sectional shape which is believed to be detrimental to chip evacuation from the flute. A flute without such convex portion is illustrated in FIG. 3 of CN 102303158.

It has now been found that provision of a convex portion, albeit of a specific size can provide an advantageous chip ejection effect during machining of a titanium workpiece (consequently, the convexly shaped portion of the subject matter of the present application is entitled an "ejecting portion"). More precisely, it has been found that such ejecting portions provide better machining performance during titanium slotting operations which have limited space for chip evacuation, with particularly good results shown at relatively high titanium machining speeds.

A further consideration when machining titanium is reduction of chatter, typically by asymmetric features of an end mill. Despite perceived benefits of asymmetry, an end mill having a symmetric index angle arrangement was found to have comparative longevity.

For the purposes of the specification and the claims, an end mill with a symmetric index angle arrangement is defined as one where, at a cutting end face, every flute has an index angle value identical to an index angle value of an opposing flute. Conversely, an end mill with an asymmetric index angle arrangement is one which does not fall within this definition.

In accordance with a first aspect of the subject matter of the present application, there is provided an end mill for machining titanium, the end mill comprising a cutting portion having teeth alternated with helically shaped flutes and a cutting portion diameter $D_E$; each tooth comprising a blunt cutting edge formed at an intersection of a rake cutting sub-surface and a relief surface, and a rake recessed sub-surface recessed in the tooth more than the rake cutting sub-surface; each flute comprising, in a plane perpendicular to a rotation axis of the end mill, a concavely shaped bending portion connected to a convexly shaped ejecting portion, the convexly shaped ejection portion having an ejection height E fulfilling the condition $0.010 D_E < E < 0.031 D_E$.

In accordance with another aspect of the subject matter of the present application, there is provided an end mill for machining titanium, having a longitudinally extending rotation axis $A_R$ and comprising:

a shank portion, and
a cutting portion extending from the shank portion to a cutting end face and being integrally formed with at least four cutting teeth alternated with helically shaped flutes and having a cutting portion diameter $D_E$;
each tooth comprising
a rake surface,
a relief surface,
a cutting edge formed at an intersection of the rake and relief surfaces, and
a relief edge spaced apart from the cutting edge and formed at an intersection of the relief surface and an adjacent surface of the flute succeeding the tooth;
each rake surface comprising
a rake recessed sub-surface,
a rake cutting sub-surface positioned further than the rake recessed sub-surface from the rotation axis and raised above the rake recessed sub-surface, relative to an imaginary radial line passing through the cutting edge, and
a rake discontinuity formed at an intersection of the rake recessed and rake cutting sub-surfaces;
wherein each tooth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;
wherein, in a plane perpendicular to the rotation axis $A_R$, each flute comprises a convexly shaped ejecting portion and a concavely shaped bending portion connecting the ejecting portion and the rake recessed sub-surface;
wherein the ejecting portion has an ejection height E which is measurable between an apex of the ejecting portion to an imaginary straight line extending from a nadir of the adjacent bending portion to the adjacent relief edge, the ejection height E having a magnitude fulfilling the condition $0.010D_E<E<0.031D_E$; and
wherein, at the cutting end face, index angles of the flutes are in a symmetric index angle arrangement.

In accordance with still another aspect of the subject matter of the present application, there is provided an end mill for machining titanium, having a longitudinally extending rotation axis $A_R$ and comprising:
a shank portion, and
a cutting portion extending from the shank portion to a cutting end face and being integrally formed with at least four cutting teeth alternated with helically shaped flutes and having a cutting portion diameter $D_E$;
each tooth comprising
a rake surface,
a relief surface,
a cutting edge formed at an intersection of the rake and relief surfaces, and
a relief edge spaced apart from the cutting edge and formed at an intersection of the relief surface and an adjacent surface of the flute succeeding the tooth;
each rake surface comprising
a rake recessed sub-surface,
a rake cutting sub-surface positioned further than the rake recessed sub-surface from the rotation axis and raised above the rake recessed sub-surface, relative to an imaginary radial line passing through the cutting edge, and
a rake discontinuity formed at an intersection of the rake recessed and rake cutting sub-surfaces;
wherein each tooth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;
wherein each tooth has a rake cutting sub-surface length dimension $L_D$, measured from the rake discontinuity thereof to the cutting edge thereof, fulfilling the condition $0.01R_T<L_D<0.05R_T$, wherein $R_T$ is the tooth's radius dimension, measured in a straight line from the rotation axis to the cutting edge;
wherein each tooth has a radial rake angle within a range of 6° to −6°;
wherein each flute has a helix angle H which fulfills the condition 30°<H<50°;
wherein, in a plane perpendicular to the rotation axis $A_R$, each flute comprises a convexly shaped ejecting portion and a concavely shaped bending portion connecting the ejecting portion and the rake recessed sub-surface;
wherein the ejecting portion has an ejection height E which is measurable between an apex of the ejecting portion to an imaginary straight line extending from a nadir of the adjacent bending portion to the adjacent relief edge, the ejection height E having a magnitude fulfilling the condition $0.010D_E<E<0.031D_E$; and
wherein, at the cutting end face, index angles of the flutes are in a symmetric index angle arrangement.

It will be understood that the above-said is a summary, and that any of the aspects above may further comprise any of the features described hereinbelow. Specifically, the following features, either alone or in combination, may be applicable to any of the above aspects:

A. An ejection height E can have a magnitude which fulfills the condition $0.014D_E<E<0.029D_E$. To elaborate, the range $0.010D_E<E<0.031D_E$ is believed to be feasible for machining titanium, whereas the range $0.014D_E<E<0.029D_E$ has achieved good results during testing. In theory, such moderate ejection height (i.e. $0.010D_E<E<0.031D_E$) can facilitate a suitable tooth strength (by allowing a suitable tooth width) and moment of inertia.

B. In each plane, of an effective cutting portion of an end mill, perpendicular to a rotation axis $A_R$, an ejecting portion and bending portion can be present. In each plane, the ejecting portion can have an ejection height E fulfilling the above mentioned conditions (i.e., $0.010D_E<E<0.031D_E$, or $0.014D_E<E<0.029D_E$).

C. At least one helix angle can be different from another helix angle.

D. A helix angle and an ejecting portion radius of one of the flutes can be smaller than a respective helix angle and an ejecting portion radius of another one of the flutes.

E. Helix angles which are closer to a largest helix angle among the flutes than to a smallest helix angle among the flutes can be considered as relatively large helix angles and helix angles which are closer to a smallest helix angle than to the largest helix angle among the flutes can be considered as relatively small helix angles. Each flute with a relatively large helix angle can have an ejecting portion radius larger than an ejecting portion of each flute with a relatively small helix angle.

F. A helix angle and a bending portion radius of one of the flutes can be smaller than a respective helix angle and a bending portion radius of another one of the flutes.

G. Helix angles which are closer to a largest helix angle among the flutes than to a smallest helix angle among the flutes can be considered as relatively large helix angles and helix angles which are closer to a smallest helix angle than to the largest helix angle among the flutes can be considered as relatively small helix angles. Each flute with a relatively large helix angle can have a bending portion radius larger than a bending portion of each flute with a relatively small helix angle.

H. A bending portion radius of one of the flutes can be smaller than an ejecting portion radius thereof. Each flute's bending portion radius can be smaller than that flute's ejecting portion radius.

I. Potentially beneficial arrangements of thickening portions for end mills with a symmetric index angle arrangement can be as follows. At a cutting end face, only some of the flutes can comprise a concavely shaped thickening portion connecting an ejecting portion and relief edge thereof. Such thickening portions can increase tooth width and hence structural strength needed for machining titanium. The thickening portions at the end face can decrease in size with increasing proximity to a shank portion. There may be thickening portions which start at a position spaced apart from the end face and which increase in size with increasing proximity to a shank portion. An end mill can be free of thickening portions that extend along the entire cutting portion.

J. At a cutting portion, a core diameter $D_C$ can fulfill the condition $0.47D_E<D_C<0.60D_E$. The core diameter $D_C$ can be about $0.53D_E$. The prior condition ($0.47D_E<D_C<0.60D_E$) is believed to provide a feasible balance between flute size, for chip evacuation, and acceptable moment of inertia which can provide acceptable results for machining titanium. In theory, a value closer to $0.53D_E$ is believed to be optimal and such value has indeed achieved good results during testing.

K. An actual internal cutting angle can have a value which differs from the imaginary internal cutting angle by 4° to 15°. The actual internal cutting angle can differ from the imaginary internal cutting angle by 8° to 13°. The prior condition (4° to 15°) is believed to be feasible for machining titanium. In theory, reducing the difference (in particular to 8° to 13°) is believed to be optimal and the latter range has indeed achieved good results during testing.

L. Radial rake angles of each tooth can be within a range of 6° to −6°. Radial rake angles can be about 2° and about −2°. The prior range (6° to −6°) is believed to be feasible for machining titanium. In theory, smaller angles (i.e. utilizing radial rake angles smaller than 6° and −6°) is believed to increase machining performance of titanium. Indeed, values of about 2° and about −2° achieved good results during testing.

M. Teeth of an end mill can be in an arrangement wherein each second radial rake angle has the same value, which value differs from the radial rake angle of the alternate teeth. Each second tooth can have an identical geometry.

N. Each tooth can have a rake cutting sub-surface length dimension $L_D$, measured from a rake discontinuity to a cutting edge of the same tooth, fulfilling the condition $0.01R_T<L_D<0.05R_T$, wherein $R_T$ is the tooth's radius dimension measured in a straight line from the rotation axis to the cutting edge. A rake cutting sub-surface length dimension $L_D$ can be about $0.026R_T$. The prior range ($0.01R_T<L_D<0.05R_T$) is believed to be feasible for machining titanium. In theory, a cutting sub-surface length dimension $L_D$ value closer to $0.026R_T$ is believed to be optimal and such value has indeed achieved good results during testing.

O. At a cutting end face, index angles of the flutes can be in a symmetric index angle arrangement. Index angles of the flutes can be in a symmetric index angle arrangement along the entire length of the cutting portion.

P. All diametrically opposed index angles at the cutting end face are of the same magnitude. Index angles at an equal-index-angle plane $P_E$ of the cutting portion can be equal. The equal-index-angle plane $P_E$ can be in the middle of an effective length of the cutting portion.

Q. All tooth widths at the cutting end face can have the same magnitude. Such arrangement facilitates production.

R. At the cutting end face, each tooth can have a tooth width $W_T$ fulfilling the condition $0.13D_E<W_T<0.22D_E$. At the cutting end face, a tooth width $W_T$ can be about $0.165D_E$. The prior range ($0.13D_E<W_T<0.22D_E$) is believed to be feasible for machining titanium. In theory, a tooth width $W_T$ value closer to $0.165D_E$ is believed to be optimal and such value has indeed achieved good results during testing.

S. Each associated rake cutting sub-surface and rake recessed sub-surface can be arranged relative to one another such that a chip cut from a workpiece contacts the rake cutting sub-surface, but not the rake recessed sub-surface immediately adjacent the rake discontinuity on a side away from the cutting edge.

T. Each tooth can be free of serrations.

U. An end mill can have a tool life of at least 60 minutes while machining titanium, specifically TI6AL4V, at a speed $V_C$ of 80.0 meters per minute, a feed rate $F_Z$ of 0.08 millimeters per tooth, a chip thickness a, of 2.00 millimeters, a depth $a_P$ of 22.0 millimeters. Under such machining conditions the tool life can be at least 80 minutes or at least 90 minutes.

V. Each flute can have a helix angle H which fulfills the condition 30°<H<50°. A helix angle H can be about 35° or about 37°. The prior range is believed to be feasible for machining titanium. In theory, the values closer to 35° and 37° are believed to be optimal, and such values indeed achieved good results during testing. The helix angles can each be constant or variable (i.e. changing in value at one or more points, or changing in value at each point along a length of the cutting portion) along the length of the flute.

W. Each rake recessed sub-surface can be concavely shaped. Each rake recessed sub-surface can have an identical shape.

X. Each flute can be shaped to allow single-pass production thereof (allowing simpler manufacture than multi-pass production).

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Figures 1A, 1B:
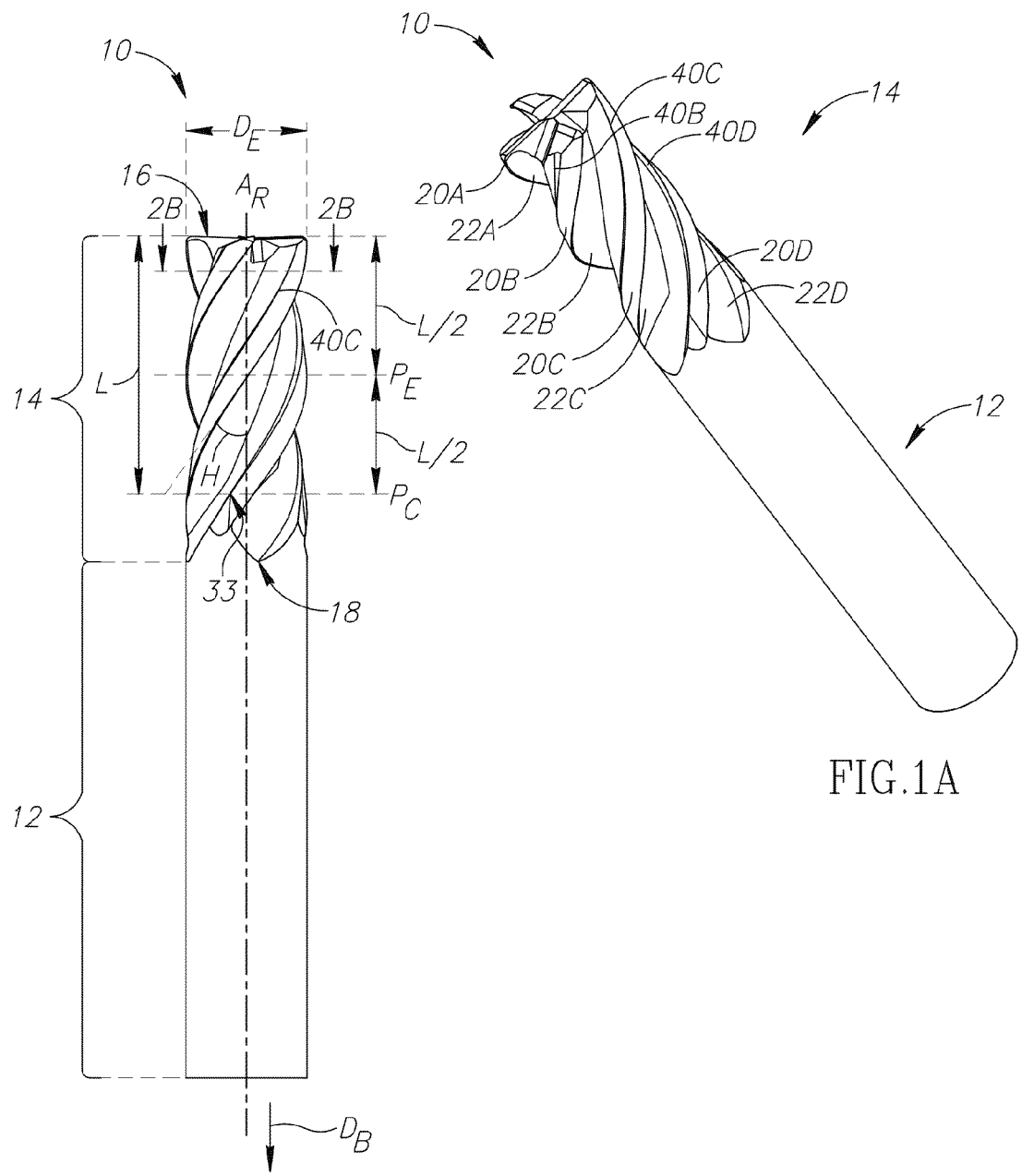
FIG. 1A is a perspective view of an end mill in accordance with the subject matter of the present application.
FIG. 1B is a side view of the end mill in FIG. 1A.

Reference is made to FIGS. 1A and 1B, which illustrate an end mill 10, typically made of extremely hard and wear-resistant material such as cemented carbide, configured for machining titanium and for rotating about a rotation axis $A_R$ extending longitudinally through the center thereof. In this example the end mill 10 rotation direction $D_R$ is counter-clockwise in the view shown in FIG. 2A.

The end mill 10 comprises a shank portion 12 and a cutting portion 14 extending therefrom.

The cutting portion 14 has a cutting portion diameter $D_E$ and extends along the rotation axis $A_R$ in a rearward axial direction $D_B$ from a cutting end face 16 to a furthermost flute end 18.

The cutting portion 14 is integrally formed with first, second, third and fourth teeth 20A, 20B, 20C, 20D, alternated with first, second, third and fourth helically shaped flutes 22A, 22B, 22C, 22D. In this example, in addition to identical opposing index angles, there is also identical structure of opposing teeth 20 and opposing flutes 22.

Figure 2A:
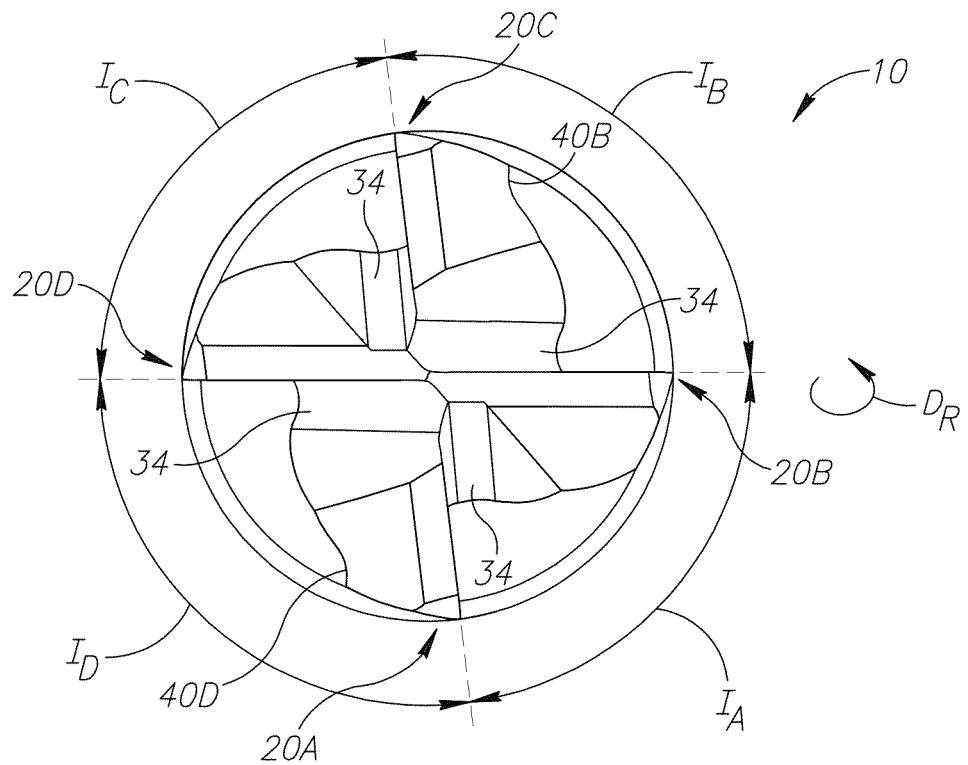
FIG. 2A is an end view of the end mill in FIGS. 1A and 1B.

Referring also to FIG. 2A, the index angles $I_A, I_B, I_C, I_D$ are in an asymmetric index angle arrangement. The index angles follow a repetitive pattern, with the following values: $I_A$=83°, $I_B$=97°, $I_C$=83°, $I_D$=97°, at the cutting end face 16, having been found effective.

Also, as shown in FIG. 2A, first and third teeth 20A, 20C can be shorter than the second and fourth teeth 20B, 20D, with teeth of each respective pair both being parallel to each other.

Hereinbelow, similar elements initially differentiated with alphabetic suffixes (e.g., "20A", "20B") may subsequently be referred to in the specification and claims without such suffixes (e.g., "20"), when referring to common features.

Figure 2B:
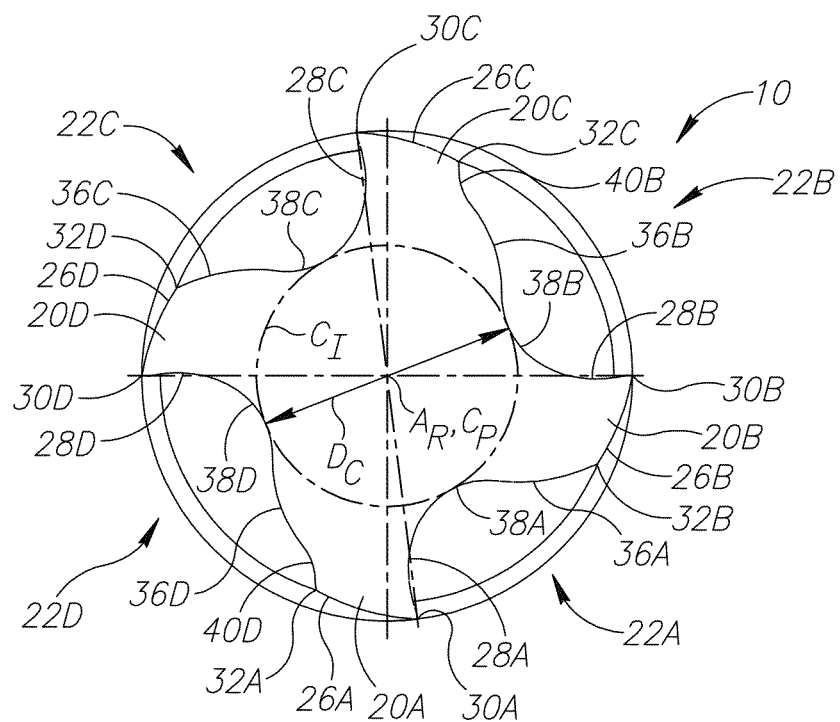
FIG. 2B is a cross-section view taken along line 2B-2B in FIG. 1B.

Referring also to FIG. 2B, each tooth 20 comprises a relief surface 26A, 26B, 26C, 26D a rake surface 28A, 28B, 28C, 28D, a cutting edge 30A, 30B, 30C, 30D formed at intersections of the relief and rake surfaces 26, 28 and a relief edge 32A, 32B, 32C, 32D formed at intersections of each relief surface 26 and an adjacent surface of a succeeding flute 22. In this example, at the cutting end face 16, first and third teeth 20A, 20C are succeeded by second and fourth flutes 22B, 22D with second and fourth thickening portions 40B, 40D, described further below, and in such cases the thickening portion 40 is the closest (adjacent) portion of the succeeding flute 22. Therefore, for example, at the cutting end face 16, the first relief edge 32A is formed at an intersection of the first relief surface 26A and the fourth thickening portion's surface 40D. Whereas, for example, the second relief edge 32B is formed at an intersection of the second relief surface 26B and a first convexly shaped ejecting portion 36A, described further below.

The cutting portion 14 has an effective cutting length L extending from the cutting end face 16 to a cutting length plane $P_C$ extending perpendicular to the rotation axis $A_R$ and positioned where the flutes 22 begin to exit (i.e. become more shallow) or where tooth relief surfaces 33 are no longer effective. An effective cutting portion is defined from the cutting end face 16 to the cutting length plane $P_C$.

While all diametrically opposed index angles (I) at the cutting end face 16 are of the same magnitude, provision of a plane at which the index angles are equal, namely an equal-index-angle plane $P_E$ of the cutting portion can be equal, as this can simplify manufacture of the end mill 10. The equal-index-angle plane $P_E$ is believed to have the most benefit when being located in the middle of an active cutting portion, i.e. half the distance (L/2) from the cutting end face 16 to the cutting length plane $P_C$.

The end mill 10 can be gashed, and in this example end gashes 34 are shown in FIG. 2A.

Each flute 22 comprises a convexly shaped ejecting portion 36A, 36B, 36C, 36D, a concavely shaped bending portion 38A, 38B, 38C, 38D connecting each ejecting portion 36 and each rake surface 28.

Each flute 22 can also comprise a corresponding one of first, second, third and fourth concavely shaped thickening portions 40A, 40B, 40C, 40D connecting an associated ejecting portion 36 and relief edge 32 thereof. As shown in FIG. 1A, the third thickening portion 40C (and the identical first thickening portion 40A, not shown) only starts at a position spaced apart from the cutting end face 16 and increase in size with increasing proximity to the shank portion 12. As shown in FIG. 2A, the second and fourth thickening portions 40B, 40D start at the cutting end face 16, and, as shown in FIG. 1A decrease in size with increasing proximity to the shank portion 12. An arrangement of decreasing and increasing size of thickening portions 40B can assist in providing tooth strength.

Figure 2C:
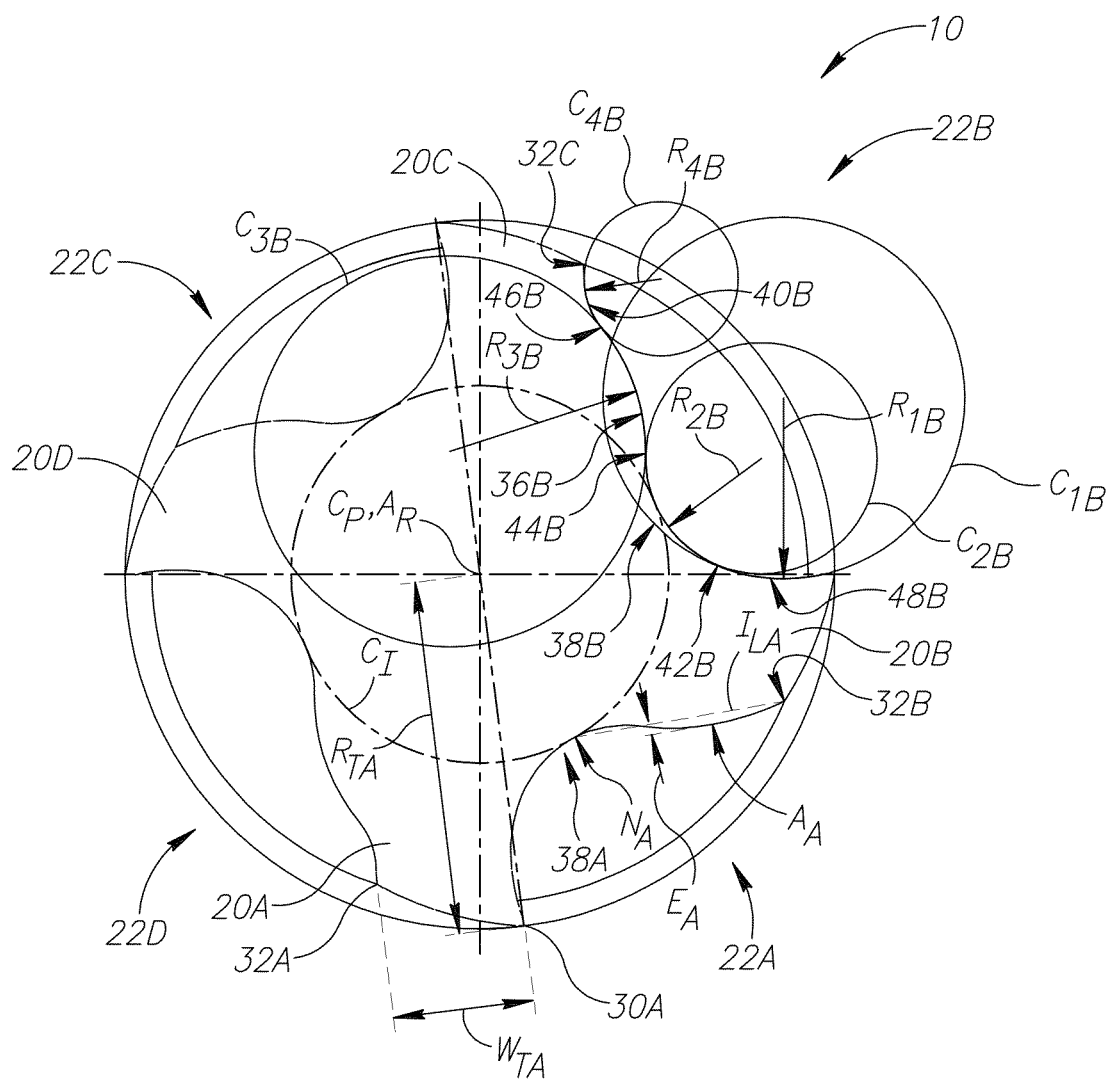
FIG. 2C is an enlarged view of FIG. 2B with imaginary circles added.

Referring now to FIG. 2C, each ejecting portion 36, bending portion 38 and rake recessed sub-surface 48 (described in further detail hereinafter) can be curved and can have a radius R corresponding to a portion of an imaginary circle C. For simplicity, the following description relates to the second flute 22B only, yet corresponding elements and reference characters are understood to be present for each flute 22 of this example. More precisely: the second rake recessed sub-surface 48B can have a rake radius $R_{1B}$ corresponding to the radius of an imaginary rake circle $C_{1B}$; the second bending portion 38B can have a bending radius $R_{2B}$ corresponding to the radius of imaginary bending circle $C_{2B}$; the second ejecting portion 36B can have a ejecting radius $R_{3B}$ corresponding to the radius of imaginary ejecting circle $C_{3B}$; and the second thickening portion 40B can have a thickening radius $R_{4B}$ corresponding to the radius of imaginary thickening circle $C_{4B}$. Within a flute's cross-section, changes from one curvature to another can occur at discontinuities therealong. For example: a first flute discontinuity 42B can be positioned at an intersection of the second rake recessed sub-surface 48B and the second bending portion 38B; a second flute discontinuity 44B can be positioned at an intersection of the second bending portion 38B and the second ejecting portion 36B; and a third flute discontinuity 46B can be positioned at an intersection of the second ejecting portion 36B and the second thickening portion 40B.

It will be understood that actual end mill portions may deviate slightly from being perfectly circular. Accordingly, rake recessed sub-potions, bending portions, ejecting portions and thickening portions should be considered to approximately have such radii.

Referring to the first flute 22A as an example, measurement of an ejection height E is exemplified as follows: the ejection height $E_A$ is measurable between an apex $A_A$ of the first ejecting portion 36A to an imaginary straight line $I_{LA}$ extending from a nadir $N_A$ of the adjacent bending portion 38A (i.e., the nadir N being a closest point of a bending portion to a center point $C_P$ of an end mill) to the associated, adjacent second relief edge 32B (the second relief edge 32B defined for convenience as part of the associated second tooth 20B, however also being associated with the adjacent, succeeding first flute 22A).

Each flute 22 has a helix angle H (FIG. 1B) formed with the rotation axis $A_R$. In this example, the helix angle H of first and third flutes 22A and 22C is 37° and the helix angle of second and fourth flutes 22B and 22D is 35°. The first and third flutes 22A and 22C having a helix angle H of 37° are considered to have large helix angles, relative to the second and fourth flutes 22B and 22D having a helix angle H of 35°.

As shown in FIG. 2B, the cutting portion 14 has a core diameter $D_C$. The core diameter $D_C$ is defined as twice a sum of distances from the center point $C_P$ to a closest point of each flute 22, divided by the number of flutes. In the present example the flutes all have equal depth and consequently the core diameter $D_C$ is the diameter of an inscribed circle $C_I$ shown in FIG. 2B. To elaborate, in examples where the flutes have unequal depth, the core diameter $D_C$ is twice the average distance from the center of an end mill to a closest point of each flute.

Referring to FIG. 2C, each tooth 20, referring to the first tooth 20A as an example, has a tooth radius $R_{TA}$ and a tooth width $W_{TA}$.

In the example shown, each tooth radius $R_T$ has the same magnitude. Consequently, the cutting portion diameter $D_E$ is twice the magnitude of the tooth radius $R_T$. In examples where the teeth have unequal tooth radii, the cutting portion diameter $D_E$ is defined as twice a sum of tooth radii $R_T$ divided by the number of teeth.

The tooth width $W_{TA}$ is measurable between a first imaginary line extending from the center point $C_P$ to the cutting edge 30A and a second imaginary line parallel with the first imaginary line and which intersects the relief edge 32A.

In the example shown, each tooth width $W_{TA}$ can have the same magnitude.

For simplicity, the following description is made regarding two teeth 20B, 20C only.

Figure 3A:
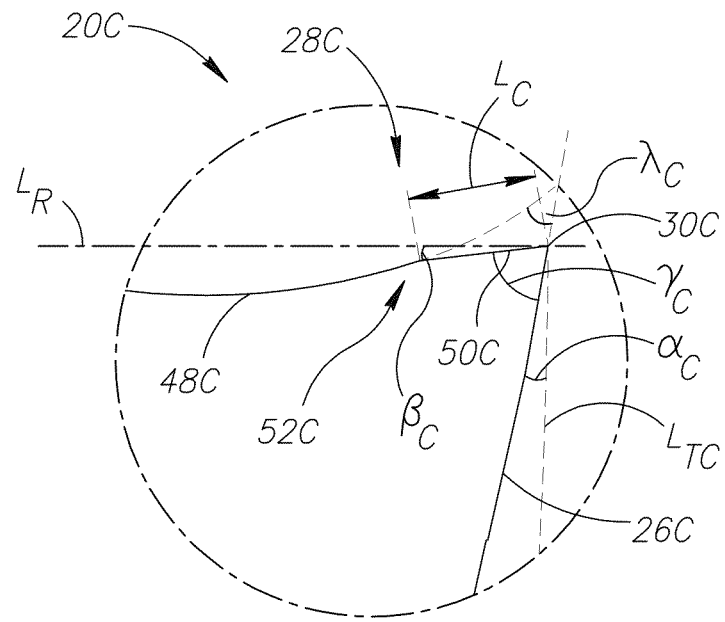
FIGS. 3A and 3B is an enlarged views of cutting edges shown in FIG. 2B.
Figure 3B:
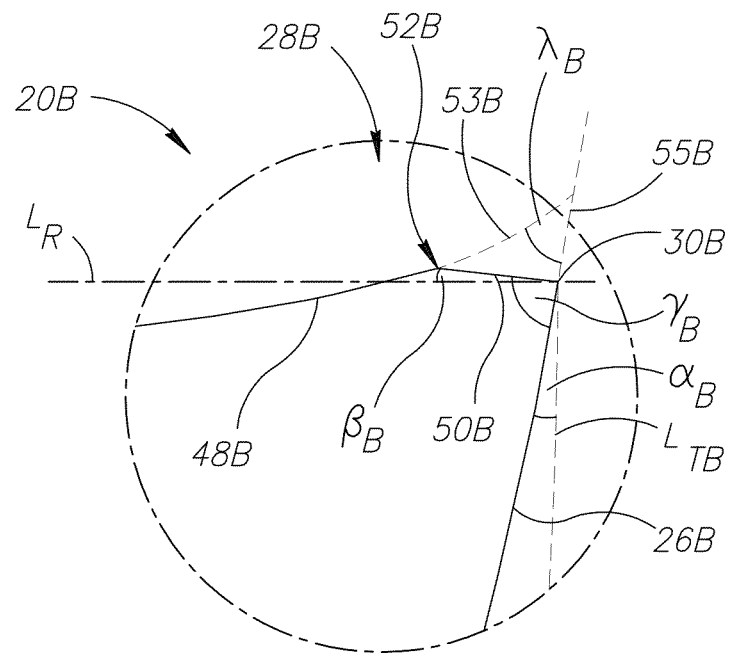

Referring to FIGS. 3A and 3B, the rake surfaces 28B, 28C each comprise a rake recessed sub-surface 48B, 48C a rake cutting sub-surface 50B, 50C and a rake discontinuity 52B, 52C formed at an intersection thereof.

To simplify manufacture, the rake recessed sub-surfaces 48 can have the same shape, which can be a concave shape as shown in FIGS. 3A and 3B. Notably, the shape is recessed from the associated rake cutting sub-surface 50 so that metal chips which have been cut from a workpiece (not shown) can preferably pass over the rake recessed sub-surfaces 48 without contact, especially at points immediately adjacent the rake discontinuity 52, thereby reducing heat transfer to the end mill.

Each rake cutting sub-surface 50 has an actual internal cutting angle $\gamma_B$, $\gamma_C$ having a greater value than an imaginary internal cutting angle $\lambda_B$, $\lambda_C$ associated with the rake recessed sub-surface 48 of the same tooth 20. More precisely, referring to FIG. 3B as an example, an imaginary rake extension line 53B, extending the second rake recessed sub-surface 48B from the rake discontinuity 52B intersects an imaginary relief extension line 55B which extends the second relief surface 26B and forms an acute internal cutting angle $\lambda_B$ at an intersection thereof.

As best seen in FIGS. 3A and 3B, the cross-section of each rake cutting sub-surface 50 can be straight.

Each tooth 20 can have a rake cutting sub-surface length dimension $L_{DC}$ (shown only in FIG. 3A, but existing for each rake cutting sub-surface 50). In this example, $L_{DC}$ is $0.026R_T$.

Each tooth 20 can have a radial rake angle β measured from an imaginary radial line $L_R$ of the end mill 10 which extends from rotation axis $A_R$ to the cutting edge 30, to the rake cutting sub-surface 50.

In the example shown, the radial rake angle $\beta_B$ of the second tooth 20B is $-2°$ and the radial rake angle $\beta_C$ of the third tooth 20C is 2°.

The relief surfaces 26 can both form the same radial relief angle $\alpha_B$, $\alpha_C$, measured relative to an imaginary circular line $L_{TB}$, $L_{TC}$ having the same diameter of the associated tooth 20. In the example shown, the radial relief angles $\alpha_B$, $\alpha_C$ are 7°.

Test results shown in FIGS. 4A to 4D, show comparative tool lives of different end mills designed for machining titanium. In each instance, tool life was determined by halting machining at predetermined intervals (or upon detecting a rise in power requirements for machining) and determining the wear of the tool. Tool failure, after which continued machining was halted, was considered to be upon flank wear reaching 0.2 mm or corner wear reaching 0.5 mm.

In the tests, end mills numbered as:
"no. 1" are in accordance with the subject matter of the present application;
"no. 2" have an ejecting portion in accordance with the subject matter of the present application, but one notable difference to end mill no. 1 is an asymmetric index angle arrangement;
"no. 3" have the same coating as end mill no. 1 and are similarly free of serrated teeth, but a notable differences include the cutting edges not being blunt and an asymmetric index angle arrangement; and
"no. 4" have the same coating as end mill no. 1, but notable differences include serrated teeth, the cutting edges not being blunt, common helix angles for the entire length of the cutting portion, and an asymmetric index angle arrangement.

More particularly, FIGS. 4A to 4D each show the results of testing the end mills by cutting a different metal under specific machining conditions. Table 1 below shows the correspondence between each of FIGS. 4A to 4D, regarding the metal being cut and the machining conditions, and Table 2 presents, in tabular form, the test results.

TABLE 1

Tested Materials and Machining Conditions

Figure 4A:
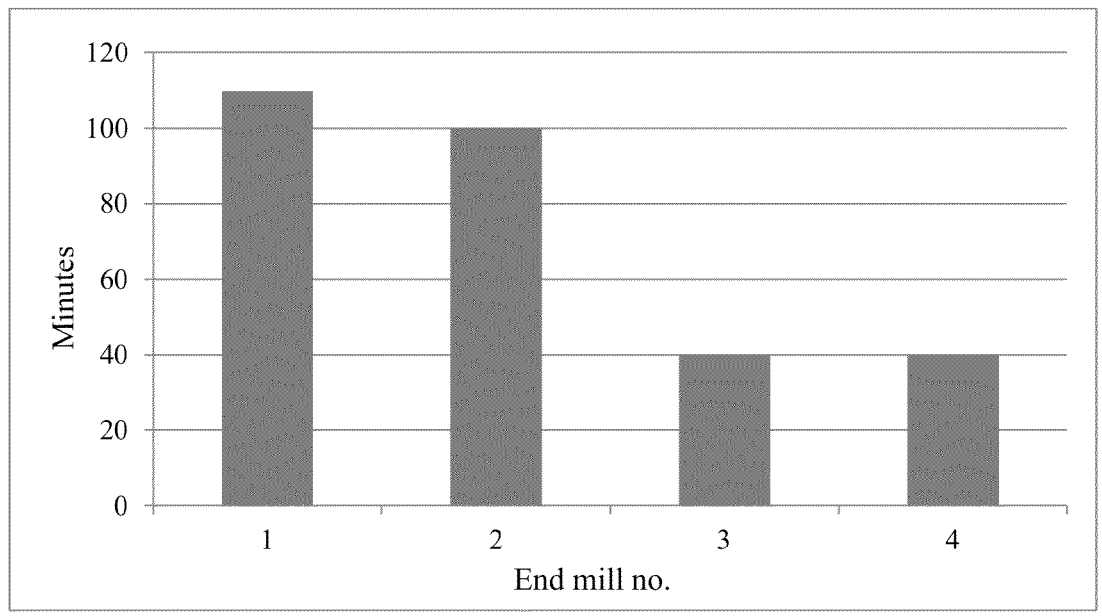
FIGS. 4A-4D show test results of end mills including the end mill in FIGS. 1A-3B.
Figure 4B:
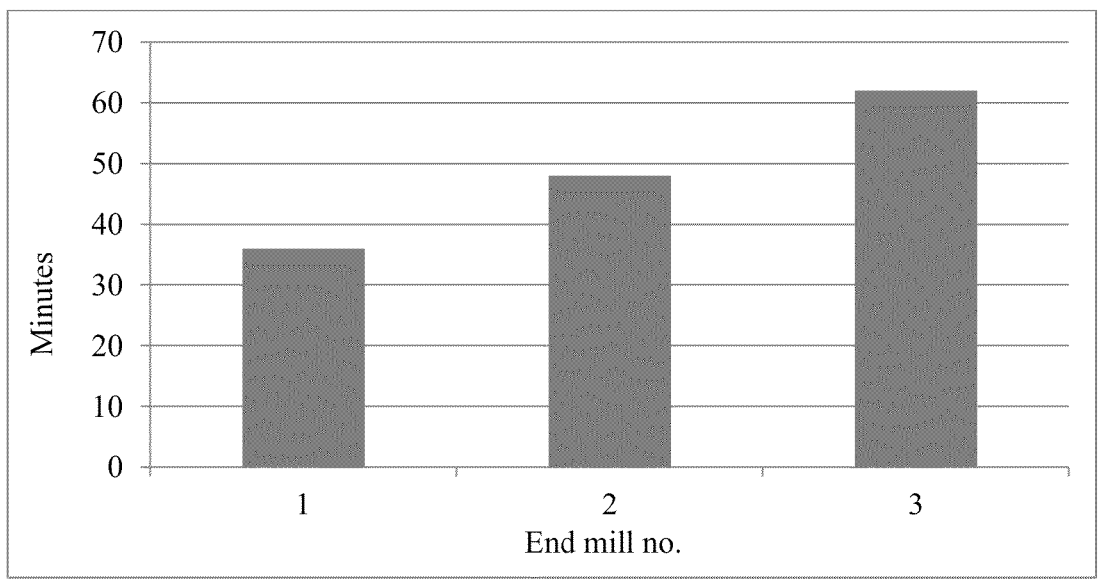
Figure 4C:
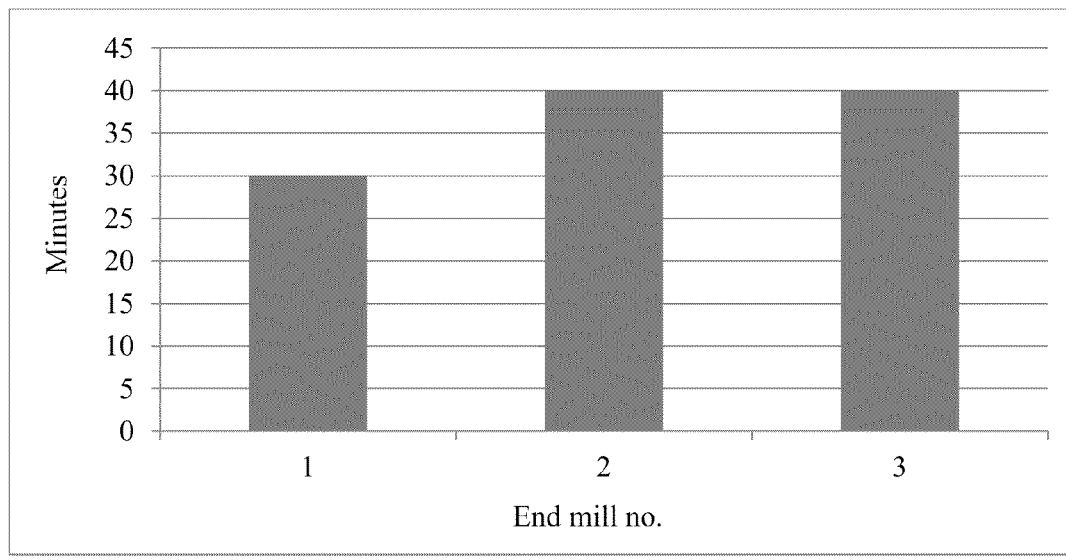
Figure 4D:
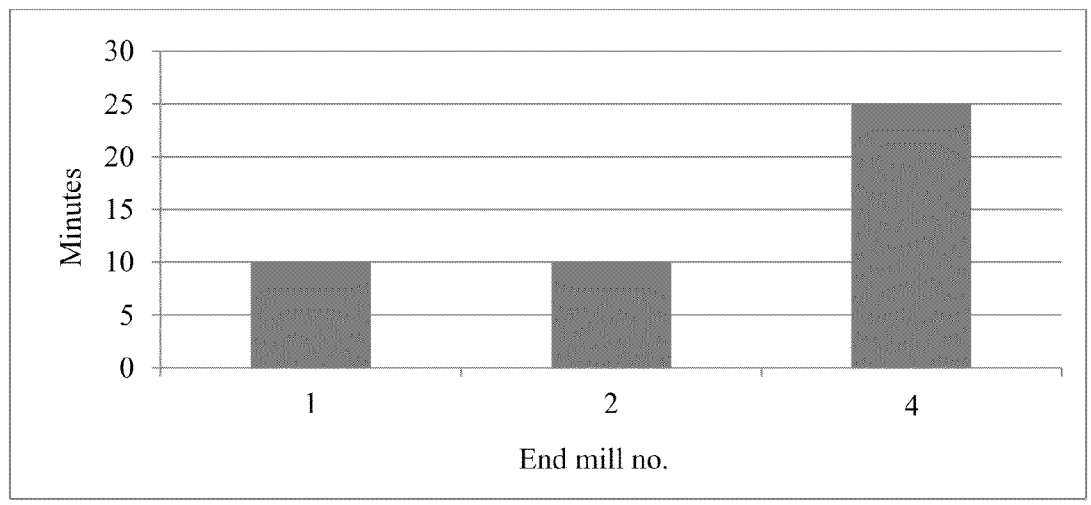

| | FIG. 4A | FIG. 4B | FIG. 4C | FIG. 4D |
|---|---|---|---|---|
| Tested Material | Titanium TI6AL4V | Steel AISI 4340 Hardness 42 (HRc) | Stainless Steel 304L Hardness 190 (HRb) | Steel DIN 1.2311 Hardness 52 (HRc) |
| speed $V_C$ (meters/minute) | 80.0 | 180.0 | 100.0 | 140.0 |
| feed rate $F_Z$ (mm per tooth) | 0.08 | 0.08 | 0.08 | 0.04 |
| chip thickness $a_e$ (mm) | 2.00 | 5.00 | 4.00 | 3.00 |
| depth $a_p$ (mm) | 22.0 | 20.0 | 22.0 | 22.0 |

TABLE 2

Tool Life (time till halt) for end mills

| End mill no. | FIG. 4A (minutes) | FIG. 4B (minutes) | FIG. 4C (minutes) | FIG. 4D (minutes) |
|---|---|---|---|---|
| 1 | 110 | 36 | 30 | 10 |
| 2 | 100 | 48 | 40 | 10 |
| 3 | 40 | 62 | 40 | Not tested |
| 4 | 40 | Not tested | Not tested | 25 |

The results of the titanium machining test shown in FIG. 4A indicate that end mill no. 1, which was made in accordance with the subject matter of the present application, had the longest tool life. Notably, however, the results seen in FIGS. 4B-4D indicate that this is not evident when machining other materials.

The description above includes an exemplary embodiment which does not exclude non-exemplified embodiments from the claim scope of the present application.

What is claimed is:

1. An end mill for machining titanium, having a longitudinally extending rotation axis $A_R$ and comprising:
   a shank portion, and
   a cutting portion extending from the shank portion to a cutting end face and being integrally formed with at least four cutting teeth alternated with helically shaped flutes and having a cutting portion diameter $D_E$;
   each tooth comprising
   a rake surface,
   a relief surface,
   a cutting edge formed at an intersection of the rake and relief surfaces, and
   a relief edge spaced apart from the cutting edge and formed at an intersection of the relief surface and an adjacent surface of the flute succeeding the tooth;
   each rake surface comprising
   a rake recessed sub-surface,
   a rake cutting sub-surface positioned further than the rake recessed sub-surface from the rotation axis and raised above the rake recessed sub-surface, relative to an imaginary radial line passing through the cutting edge, and
   a rake discontinuity formed at an intersection of the rake recessed and rake cutting sub-surfaces;
   wherein each tooth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;
   wherein, in a plane perpendicular to the rotation axis $A_R$, each flute comprises a convexly shaped ejecting portion and a concavely shaped bending portion connecting the ejecting portion and the rake recessed sub-surface;
   wherein the ejecting portion has an ejection height E which is measurable between an apex of the ejecting portion to an imaginary straight line extending from a nadir of the adjacent bending portion to the adjacent relief edge, the ejection height E having a magnitude fulfilling the condition $0.010D_E < E < 0.031D_E$; and
   wherein, at the cutting end face, index angles of the flutes are in a symmetric index angle arrangement.

2. The end mill according to claim 1, wherein the ejection height E has a magnitude which fulfills the condition $0.014D_E < E < 0.029D_E$.

3. The end mill according to claim 1, wherein said ejecting portion, bending portion and ejection height E, are present in each plane perpendicular to the rotation axis $A_R$ of an effective cutting portion of the end mill.

4. The end mill according to claim 1, wherein a helix angle and an ejecting portion radius of one of the flutes is smaller than a respective helix angle and an ejecting portion radius of another one of the flutes.

5. The end mill according to claim 4, wherein helix angles which are closer to a largest helix angle among the flutes than to a smallest helix angle among the flutes are considered as relatively large helix angles and helix angles which are closer to a smallest helix angle than to the largest helix angle among the flutes are considered as relatively small helix angles, and each flute with a relatively large helix angle has an ejecting portion radius larger than an ejecting portion radius of each flute with a relatively small helix angle.

6. The end mill according to claim 1, wherein a helix angle and a bending portion radius of one of the flutes is smaller than a respective helix angle and a bending portion radius of another one of the flutes.

7. The end mill according to claim 6, wherein helix angles which are closer to a largest helix angle among the flutes than to a smallest helix angle among the flutes are considered as relatively large helix angles and helix angles which are closer to a smallest helix angle than to the largest helix angle among the flutes are considered as relatively small helix angles, and each flute with a relatively large helix angle has a bending portion radius larger than a bending portion radius of each flute with a relatively small helix angle.

8. The end mill according to claim 1, wherein a bending portion radius of one of the flutes is smaller than an ejecting portion radius thereof.

9. The end mill according to claim 8, wherein each flute's bending portion radius is smaller than that flute's ejecting portion radius.

10. The end mill according to claim 1, wherein, at the cutting end face, some, but not all, of the flutes comprise a concavely shaped thickening portion connecting the ejecting portion and the relief edge.

11. The end mill according to claim 10, wherein each flute not comprising a thickening portion at the cutting end face, comprises a thickening portion which starts at a position spaced apart from the cutting end face.

12. The end mill according to claim 11, wherein some of the thickening portions decrease in size and others increase in size, as each thickening portion extends in a direction away from the cutting end face.

13. The end mill according to claim 1, wherein at the cutting portion a core diameter $D_C$ fulfills the condition $0.47D_E < D_C < 0.60D_E$.

14. The end mill according to claim 1, wherein the actual internal cutting angle has a value which differs from the imaginary internal cutting angle by 4° to 15°.

15. The end mill according to claim 1, wherein each tooth has a radial rake angle within a range of 6° to −6°.

16. The end mill according to claim 1, wherein the teeth are in an arrangement wherein each second radial rake angle has the same value, which value differs from the radial rake angle of the alternate teeth.

17. The end mill according to claim 1, wherein each tooth has a rake cutting sub-surface length dimension $L_D$, measured from the rake discontinuity to the cutting edge of the same tooth, fulfilling the condition $0.01R_T < L_D < 0.05R_T$, wherein $R_T$ is the respective tooth's radius dimension.

18. The end mill according to claim 1, wherein all tooth widths at the cutting end face are the same magnitude.

19. The end mill according to claim 1, wherein each associated rake cutting sub-surface and rake recessed sub-surface are arranged relative to one another such that a chip cut from a workpiece contacts the rake cutting sub-surface, but not the rake recessed sub-surface immediately adjacent the rake discontinuity on a side away from the cutting edge.

20. The end mill according to claim 1, wherein each tooth is free of serrations.

21. The end mill according to claim 1, wherein index angles of the flutes have the same magnitude in an equal-index-angle plane $P_E$.

22. The end mill according to claim 1, wherein each flute has a helix angle H which fulfills the condition 30°<H<50°.

23. The end mill according to claim 1, wherein each tooth, at the cutting end face, can have a tooth width $W_T$ fulfilling the condition $0.13D_E < W_T < 0.22D_E$.

24. An end mill for machining titanium, having a longitudinally extending rotation axis $A_R$ and comprising:

a shank portion, and a cutting portion extending from the shank portion to a cutting end face and being integrally formed with at least four cutting teeth alternated with helically shaped flutes and having a cutting portion diameter $D_E$;

each tooth comprising a rake surface, a relief surface, a cutting edge formed at an intersection of the rake and relief surfaces, and a relief edge spaced apart from the cutting edge and formed at an intersection of the relief surface and an adjacent surface of the flute succeeding the tooth;

each rake surface comprising a rake recessed sub-surface, a rake cutting sub-surface positioned further than the rake recessed sub-surface from the rotation axis and raised above the rake recessed sub-surface, relative to an imaginary radial line passing through the cutting edge, and a rake discontinuity formed at an intersection of the rake recessed and rake cutting sub-surfaces;

wherein each tooth comprises an actual internal cutting angle formed at an intersection of the rake cutting sub-surface and the relief surface, the actual internal cutting angle having a greater value than an imaginary internal cutting angle formed at an intersection of imaginary extension lines of the rake recessed sub-surface and the relief surface;

wherein each tooth has a rake cutting sub-surface length dimension $L_D$, measured from the rake discontinuity thereof to the cutting edge thereof, fulfilling the condition $0.01R_T<L_D<0.05R_T$, wherein $R_T$ is the tooth's radius dimension, measured in a straight line from the rotation axis to the cutting edge;

wherein each tooth has a radial rake angle within a range of 6° to −6°;

wherein each flute has a helix angle H which fulfills the condition 30°<H<50°;

wherein, in a plane perpendicular to the rotation axis $A_R$, each flute comprises a convexly shaped ejecting portion and a concavely shaped bending portion connecting the ejecting portion and the rake recessed sub-surface;

wherein the ejecting portion has an ejection height E which is measurable between an apex of the ejecting portion to an imaginary straight line extending from a nadir of the adjacent bending portion to the adjacent relief edge, the ejection height E having a magnitude fulfilling the condition $0.010D_E<E<0.031D_E$; and wherein, at the cutting end face, index angles of the flutes are in a symmetric index angle arrangement.

25. The end mill according to claim 24, wherein in at least one cross-section perpendicular to the rotation axis $A_R$:

for at least one tooth, the rake discontinuity is rotationally forward of the imaginary radial line; and for at least one other tooth, the rake discontinuity is rotationally rearward of the imaginary radial line.

26. The end mill according to claim 24, wherein the cross-section of each rake sub-surface is straight.

27. The end mill according to claim 1, wherein in at least one cross-section perpendicular to the rotation axis $A_R$:

for at least one tooth, the rake discontinuity is rotationally forward of the imaginary radial line; and for at least one other tooth, the rake discontinuity is rotationally rearward of the imaginary radial line.

28. The end mill according to claim 1, wherein the cross-section of each rake sub-surface is straight.

29. A method of machining a titanium workpiece, comprising:

providing the end mill according to claim 1; and machining the workpiece at a speed Vc of at least 80.0 meters per minute.

30. The method according to claim 29, comprising:

machining the workpiece for at least 60 minutes.

31. The method according to claim 30, comprising:

machining the workpiece for at least 80 minutes.

32. The method according to claim 29, one or more of the following:

(a) machining the workpiece at a feed rate $F_Z$ of at least 0.08 mm per tooth;

(b) machining the workpiece such that a chip thickness $a_e$ is at least 2.00 mm; and (c) machining the workpiece such that a depth $a_p$ is at least 22.0 mm.

* * * * *